(12) United States Patent
Savchenkov et al.

(10) Patent No.: US 7,024,069 B2
(45) Date of Patent: Apr. 4, 2006

(54) TUNABLE RESONATOR-BASED DEVICES FOR PRODUCING VARIABLE DELAYS AND NARROW SPECTRAL LINEWIDTHS

(75) Inventors: Anatoliy Savchenkov, La Crescenta, CA (US); Lutfollah Maleki, Pasadena, CA (US); Andrey B. Matsko, Pasadena, CA (US); Vladimir Ilchenko, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/956,876

(22) Filed: Oct. 1, 2004

(65) Prior Publication Data

US 2005/0074200 A1 Apr. 7, 2005

Related U.S. Application Data

(60) Provisional application No. 60/507,983, filed on Oct. 1, 2003.

(51) Int. Cl.
G02B 6/26 (2006.01)
(52) U.S. Cl. .......................................... 385/15; 385/129
(58) Field of Classification Search .................... 385/1, 385/14, 15, 16, 24, 28, 30, 50, 129–132
See application file for complete search history.

(56) References Cited

U.S. PATENT DOCUMENTS

| 4,676,583 A * | 6/1987 | Hicks, Jr. ..................... 385/31 |
| 6,130,969 A * | 10/2000 | Villeneuve et al. ........... 385/27 |
| 6,411,752 B1 * | 6/2002 | Little et al. .................... 385/17 |
| 6,473,541 B1 * | 10/2002 | Ho ................................. 385/15 |
| 6,633,696 B1 * | 10/2003 | Vahala et al. .................. 385/27 |
| 6,668,006 B1 * | 12/2003 | Margalit et al. ............... 372/97 |
| 2002/0021765 A1 * | 2/2002 | Maleki et al. ............... 375/300 |

OTHER PUBLICATIONS

Little; Advances in Microring Resonators; 2003, Integrated Photonics Research Conference 2003□□Invited Talk (www.lilleoptics.com/ipr_lo.pdf.*

Chu, et al; *Second-Order Filter Response from Parallel Coupled Glass Microring Resonators*; Nov. 1999; IEEE Photonics Technology Letters, vol. 11, No. 11; pps. 1426-1428.

Fan; *Sharp asymmetric line shapes in side-coupled waveguide-cavity systems*; Feb. 11, 2002; Applied Physics Letters, vol. 80, No. 6; pps. 908-910.

(Continued)

*Primary Examiner*—Kaveh Kianni
*Assistant Examiner*—Christopher M. Kalivoda
(74) *Attorney, Agent, or Firm*—Fish & Richardson P.C.

(57) ABSTRACT

Devices with two or more coupled resonators to produce narrow spectral responses due to interference of signals that transmit through the resonators and techniques for operating such devices to achieve certain operating characteristics are described. The devices may be optical devices where optical resonators such as whispering gallery mode resonators may be used. In one implementation, at least one of the coupled optical resonators is a tunable resonator and is tuned to change its resonance frequency to tune the spectral response of the device. The described devices and techniques may be applied in optical filters, optical delays, optical waveform generators, and other applications.

40 Claims, 6 Drawing Sheets

OTHER PUBLICATIONS

Ilchenko, et al.; *Whispering-gallery-mode electro-optic modulator and photonic microwave receiver*; Feb. 2003; J. Opt. Soc. Am. B, vol. 20, No. 2; pps. 333-342.

Little; *Advances in Microring Resonators*; 2003, Integrated Photonics Research Conference 2003 Invited Talk (www.littleoptics.com/ipr_lo.pdf).

Xu, et al.; *Scattering-theory analysis of waveguide-resonator coupling*; Nov. 2000; The American Physical Society, vol. 62, No. 5; pps. 7389-7404.

Yariv; *Critical Coupling and Its Control in Optical Waveguide-Ring Resonator Systems*; Apr. 2002; IEEE Photonics Technology Letters, vol. 14, No. 4; pps. 483-485.

\* cited by examiner

*Field localization*

TUNABLE RESONATOR-BASED DEVICES FOR PRODUCING VARIABLE DELAYS AND NARROW SPECTRAL LINEWIDTHS

This application claims the benefit of U.S. Provisional Patent Application No. 60/507,983 entitled "Tunable delay lines and high order filters with interacting whispering gallery mode cavities" and filed Oct. 1, 2003, the entire disclosure of which is incorporated herein by reference as part of the specification of this application.

FEDERALLY FUNDED RESEARCH STATEMENT

The research and development for inventions described in this application received funding under Contract No. NAS7-1407 from NASA. The U.S. Government may have certain rights to various technical features described in this application.

BACKGROUND

This application relates to optical devices have frequency-dependent responses, including optical devices with optical resonators.

SUMMARY

This application describes resonator-based devices and techniques that couple at least two resonators to achieve tunable delays and spectral linewidths. For example, one device described here includes a first resonator in resonance with electromagnetic radiation at a first resonance frequency that is tunable to change the first resonance frequency, a first waveguide coupled to the first resonator to exchange electromagnetic radiation, a second waveguide coupled to the first resonator to exchange electromagnetic radiation, and a second resonator in resonance with electromagnetic radiation with a second resonance frequency. The second resonator is coupled to the first and second waveguides, respectively, to cause an electromagnetic interference between electromagnetic signals that transmit through the first and second resonators via the first and second waveguides to produce a narrow spectral transmission peak centered at an average frequency of the first and the second resonance frequencies. The device further includes a tuning mechanism to tune the first resonator to change a difference between the first and second resonance frequencies to change a delay of electromagnetic radiation in the transmission peak. This device may be configured to operate on different signals, e.g., microwave signals, millimeter wave signals, and optical signals.

These and other implementations, features, and associated advantages are described in greater detail in the drawings, the detailed description, and the claims.

DETAILED DESCRIPTION

The devices and techniques described here use two or more optical resonators that are optically coupled with one another to produce an optical resonance transmission peak that is narrower than the natural transmission linewidth of each resonator. The optical coupling of the resonators causes optical interference between the resonators (e.g., interference of their optical delays) that leads to the narrow transmission peak. The resonators may be directly coupled with one another, indirectly coupled with one another via optical waveguides, or coupled both directly between two adjacent resonators and indirectly via waveguides. At least one of the resonators is tunable to change its resonance frequency to adjust the center frequency of the narrow transmission peak and the optical delay in light spectrally located in the narrow transmission peak. Notably, the described device designs and techniques are applicable to other electromagnetic frequencies outside the optical spectral range, such as the microwave and millimeter frequencies where microwave resonators and waveguides, for example, are used to implement the desired wave coupling and tuning in frequency.

The specific examples described here are in optical domain and use optical waveguides and whispering gallery mode resonators. In particular, device designs with a parallel configuration of two interacting whispering-gallery-mode optical resonators are described to show a narrowband modal structure as a basis for a widely tunable delay line. The optical coupling can be optimized so that such devices produce an unusually narrow spectral feature with a much narrower bandwidth than the loaded bandwidth of each individual resonator.

This effect of the devices described here is analogous to the phenomenon of electromagnetically induced transparency (EIT) in resonantly absorbing quantum systems. The quantum-mechanical interference of spontaneous emissions from two close energy states coupled to a common ground state results in ultranarrow resonances in EIT. The devices and techniques described here produce similar narrow resonances based on classic cavity modes and the interference between direct and resonance-assisted indirect pathways for decays in two coupled resonators. This is the same Fano resonance for optical resonators that has been shown to result in sharp asymmetric line shapes in a narrow frequency range in periodic structures and waveguide-cavity systems.

Figure 1A:
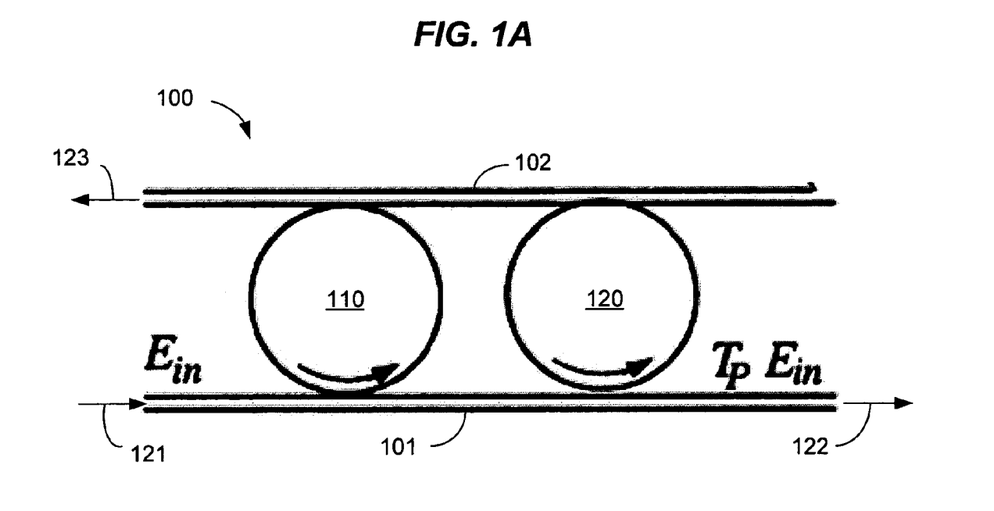
FIG. 1A shows an example of a resonator-based device showing two coupled resonators to produce a narrow transmission peak with tunable peak frequency, delay and spectral linewidth.

FIG. 1A shows one example of an optical device 100 with two optical resonators 110 and 120 optically coupled to two separate optical waveguides 101 and 102. The two waveguides 101 and 102 are shown to be parallel but may not necessarily so in implementations. The first resonator 110 is optically coupled to the first waveguide 101 at a first location of the resonator 110 to exchange optical energy with the first waveguide 101 and to the second waveguide 102 at a second location of the resonator 110 to exchange optical energy with the second waveguide 102. The optical coupling with each waveguide may be evanescent coupling. The second resonator 120 is coupled to the waveguides 101 and 102 in a similar configuration. The resonators 110 and 120 may be implemented in various configurations such as ring resonators and whispering gallery mode (WGM) resonators. A suitable ring resonator may be formed in waveguide rings like fiber rings or integrated waveguide rings on substrates or by three or more reflectors to form a closed optical loop. A WGM resonator may be implemented in a number of configurations, including, microsphere WGM resonators, microdisk WGM resonators with spherical and non-spherical exterior surfaces, and microring WGM resonators with spherical and non-spherical exterior surfaces. The non-spherical exterior surfaces may be spheriodal surfaces of spheroids or conic surfaces. The two waveguides 101 and 102 may be implemented by, e.g., fibers and integrated waveguides formed on substrates.

The two resonators 110 and 120 may be spaced from each other so there is no direct optical coupling between the two resonators 110 and 120. Alternatively, the two resonators 110 and 120 may be directly coupled to each other to exchange optical energy without relying on optical coupling via the waveguides 101 and 102. Regardless whether there is a direct coupling between the two resonators 110 and 120, the two waveguides 101 and 102 provide an optical coupling mechanism between the resonators 110 and 120. In FIG. 1A, an input optical signal 121 is shown to enter the first waveguide 101 as an input $E_{in}$. A portion or the entirety of the signal 121 is coupled into the first resonator 110 and circulates in the resonator 110. A portion of the optical energy in the resonator 110 is coupled back into the first waveguide 101 which is subsequently coupled, either partially or entirely, into the second resonator 120. A portion of the optical energy circulating in the second resonator 120 is coupled back into the first waveguide 101 as the transmitted output 122 represented by $T_p E_{in}$, where $T_p$ is the transmission coefficient of the tunable device 100. The spectrum of the transmission coefficient $T_p$ includes a narrow transmission peak whose frequency is determined by the resonance frequencies of the two resonators 110 and 120.

In the design in FIG. 1A, the second waveguide 102 produces a reflected optical signal 123 by coupling with the two resonators 110 and 120. The coupling between the waveguide 102 and the first resonator 110 couples a portion of the optical energy circulating in the resonator 110 into the second waveguide 102 as part of the reflected signal 123. In addition, the coupling between the waveguide 102 and the second resonator 120 couples a portion of the optical energy circulating in the resonator 120 into the second waveguide 102 which is further partially or entirely coupled into the first resonator 110.

Figure 1B:
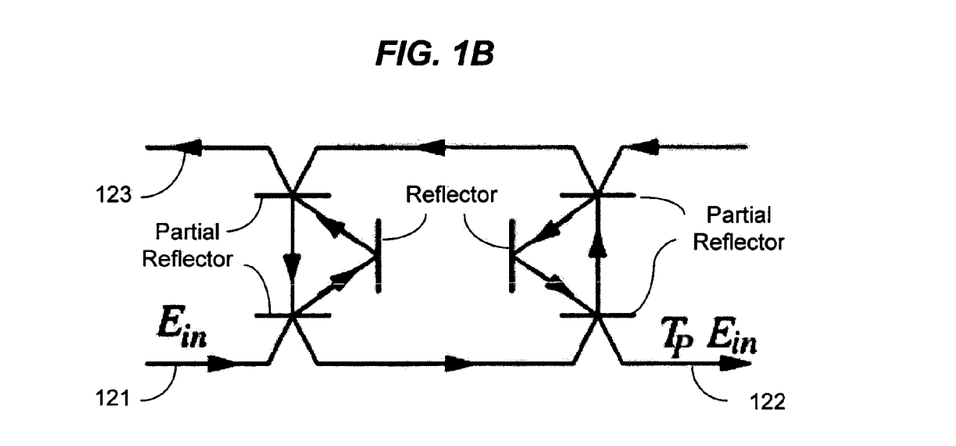
FIG. 1B shows an optical device with two ring resonators that is equivalent to the device shown in FIG. 1A in certain aspects.

Therefore, the optical configuration of the device 100 provides an optical circulation and storage mechanism to circulate and retain light between the two resonators 110 and 120 and the segments of the waveguides 101 and 120 between the resonators 110 and 120. A portion of light circulating and stored in the device 100 is reflected back in the waveguide 102 as the reflected signal 123 and another portion of the light is transmitted through the two resonators 110 and 120 as the transmitted signal 122 in the waveguide 101. FIG. 1B shows optical paths of the device 100 when the two resonators 110 and 120 are two ring cavities each having three reflectors represented by short straight lines.

The spatially overlapping and mixing of light from the two different resonators in FIG. 1A allow for the optical interference to occur and the narrow transmission peak and the circulation of light between the two resonators 110 and 120 leads to the optical delay for light in the narrow transmission peak. The following sections provide detailed explanation for the occurrence of the subnatural (i.e., narrower than loaded individual resonator 110 or 120) EIT-like linewidths. Such a device may be operated as a slow light element to produce a variable or tunable optical delay in an optical signal. Notably, one or all of the resonators 110 and 120 may be tunable resonators to tune the spectral linewidth, the delay time, and the frequency of the narrow transmission peak of the device 100. Such a tunable resonator may be designed to include various tuning mechanisms that change the resonance frequency of the resonator in response to an external control signal. As an example, WGMs in electro-optic crystalline WGM resonators may be used to provide tuning in frequency and bandwidth in the device 100 in FIG. 1A by adjusting a control signal applied to electrodes formed on the tunable resonator 110 or 120. The device in FIG. 1B may be tuned by adjusting one or more reflectors in each ring resonator to change the resonance frequency of the ring resonator via a suitable positioning mechanism that controls the position of the mirror under control, e.g., a piezo transducer.

The transmission coefficient for the tunable device 100 in FIG. 1A can be mathematically expressed as follows:

$$T_P = \frac{[\gamma + i(\omega - \omega_1)][\gamma + i(\omega - \omega_2)]}{[2\gamma_c + \gamma + i(\omega - \omega_1)][2\gamma_c + \gamma + i(\omega - \omega_2)] - 4\exp(i\psi)\gamma_c^2}, \quad (1)$$

where $\gamma$ and $\gamma_c$ are spectral linewidths caused by intrinsic cavity losses and coupling to the waveguides 101 and 102, respectively; frequencies $\omega_1$ and $\omega_2$ are resonance frequencies of modes of the resonators 110 and 120, respectively; the frequency $\omega$ is the carrier frequency of the input light; and $\psi$ stands for the coupling phase that varies with the distance between the two resonators 110 and 120.

Consider a strong coupling regime $\gamma_c \gg |\omega_1 - \omega_2| \gg \gamma$ in the tunable device 100. Assuming the frequency tunings between the input light and the resonance frequencies of the two resonators 110 and 102, $|\omega - \omega_1|$ and $|\omega - \omega_2|$, to be much less than the free spectral ranges of the two resonators 110 and 120 and let $\exp(i\psi) = 1$, the power transmission of the tunable device 100 based on the above transmission coefficient shows two minima, $$|T_p|_{min}^2 \approx \gamma^2 / 4\gamma_c^2,$$

when the frequency of the input light is tuned to the resonance frequencies of the two resonators 110 and 120: $\omega = \omega_1$ and $\omega = \omega_2$. Notably, the power transmission of the device 110 also has a local maximum at the average frequency of the two resonance frequencies of the resonators 110 and 120, $\omega = \omega_0 = (\omega_1 + \omega_2)/2$. The local maximum is given by $$|T_P|_{max}^2 \simeq \frac{(\omega_1 - \omega_2)^4}{[16\gamma\gamma_c + (\omega_1 - \omega_2)^2]^2},$$

Figure 1C:
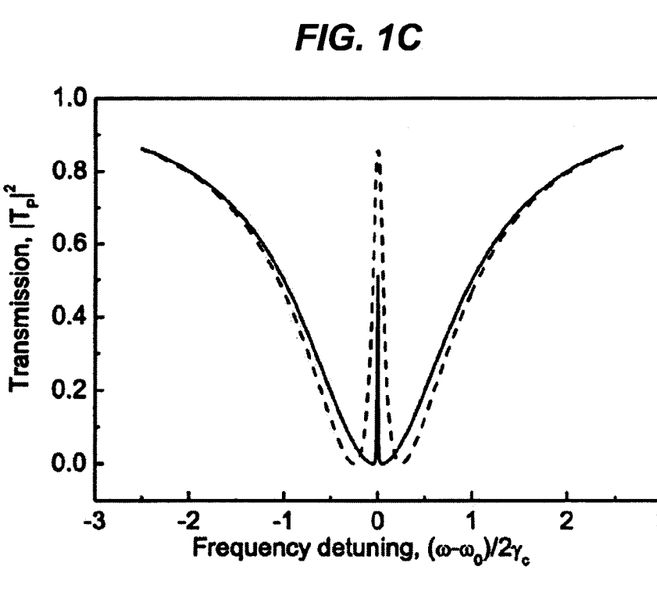
FIG. 1C shows a transmission spectrum of the transmitted signal in the device in FIG. 1A where the resonators are optical whispering gallery mode (WGM) resonators that are not directly coupled to each other and are coupled via two optical waveguides.

This local maximum is the peak of a narrow transparency feature or transmission peak whose spectral position and linewidth can be tuned by tuning either one or both of the resonators 110 and 120. FIG. 1C illustrates this transmission peak from the device in FIG. 1A. The device in FIG. 1B can also be used to achieve this transmission peak. Notably, when each resonator is lossless ($\gamma=0$), the width $\Gamma$ of the transparency feature may be arbitrarily narrow and is given by $$\Gamma \simeq \frac{[16\gamma\gamma_c + (\omega_1 - \omega_2)^2]^2}{16\gamma_c(\omega_1 - \omega_2)^2}. \quad (2)$$

That is, the frequency difference between the resonance frequencies of the two resonators 110 and 120 can be reduced to reduce the width $\Gamma$ by tuning one or both of the resonators 110 and 120. The group time delay that is originated from the narrow transparency resonance in the transmitted light is approximately $\tau_g \approx \Gamma^{-1}$:

$$\tau_g \simeq \frac{16\gamma_c(\omega_1 - \omega_2)^2}{[16\gamma\gamma_c + (\omega_1 - \omega_2)^2]^2} \gg \gamma_c^{-1}.$$

Therefore the tunable device 100 can produce a large and tunable optical delay in transmitted light and operate as an efficient source of slow light. This tunable delay exceeds the minimum group delay available from a single resonator.

The origin of this subnatural structure in the transmission spectrum of the tunable device 100 with coupled resonators 110 and 120 lies in the interference of the optical decays in the resonators 110 and 120. In fact, in the overcoupled or strong regime considered here, the resonators 110 and 120 decay primarily into the waveguides 101 and 102 rather than the free space around the resonators 110 and 120. As such, there are several possible optical paths for photons transmitted through the resonators 110 and 120, and the photons may interfere because they are localized in the same spatial configurations determined by the waveguides 101 and 102. The optical transmission of the tunable device 100 is nearly canceled when the light is resonant with one of the resonant modes, $\omega_1$ or $\omega_2$, of resonators 110 and 120. However, the interference between the resonators 110 and 120 results in a narrow transmission resonance.

Figure 2A:
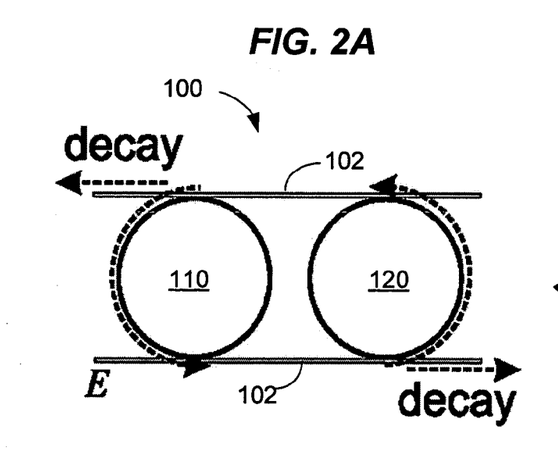
FIG. 2A shows the optical path ways in the optical device described in FIG. 1A for producing the interference between decays of the two WGM resonators.
Figure 2B:
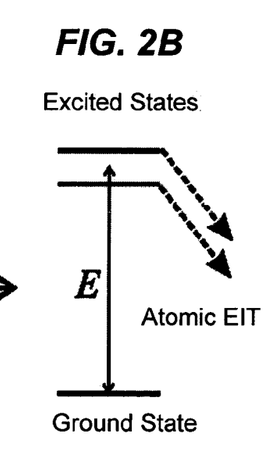
FIG. 2B shows an analogous atomic system that produces electromagnetically induced transparency under proper optical pumping.

FIG. 2A illustrate the path ways for the interference in the tunable device 100. This phenomenon is similar to the narrow transparency of EIT originating from the decay interference shown in FIG. 2B for a typical three-level atomic system that may be used to produce EIT. The delays of the two close excited states interfere with each other to produce the narrow transparent peak at a frequency where light would be strongly absorbed in absence of the delay interference.

The tunable device 100 and other devices described here based on coupled optical resonators as optical delay lines and optical filters have several advantages over the atomic, slow light systems. For example, the resonator-based devices described here produce an optical delay that depends on the frequency difference ($\omega_1 - \omega_2$) between the resonant frequencies of the two resonators. Since at least one of the resonators in the devices described here is a tunable resonator, this frequency difference can be tuned to tune the delay time. The tuning may be accomplished easily, for example, by use of resonators made from electro-optic materials such as certain crystals like lithium niobate crystals. The delay time corresponds to linewidth of the device. Hence, the linewidth can be changed or tuned by tuning one or more tunable resonators in the device. This tunable linewidth may be changed in a wide range based on the designs of the resonators, e.g., from hundreds of kilohertz to several gigahertz. It is impractical to achieve such a change in atomic vapors used for EIT systems because such tuning in atomic vapors would require a high optical intensity of light that optically excite the atomic transitions and many lasers suitable for pumping such atomic transitions cannot produce such high power.

Another advantage of the current devices is that the frequency of the transparency peak is the average frequency of the two resonance frequencies of the two resonators 110 and 120, [$(\omega_1+\omega_2)/2$], and thus is arbitrary in the sense that it is tunable by changing either or both of the resonance frequencies $\omega_1$ and $\omega_2$. Notably, the frequency of the transmission peak is continuously tunable in a wide tuning range and thus can be tuned to any desired frequency within the tuning range. This tuning capability is desirable in many applications such as devices or modules that use optical filtering devices and optical switching devices. This is an important advantage for the cascaded WGM resonators for applications in optical signal processing and optical communications. In comparison, the frequency of the EIT signal in EIT atomic systems is limited only to a small number of accessible atomic transition frequencies and generally cannot be tuned.

In addition, the resonator-based devices described here can be designed to have much lower optical losses than EIT atomic systems. Most atomic systems such as atomic vapors absorb a significant amount of light because spontaneous emission in an atomic transition is not fully suppressed and thus the input power is lost to the optical absorption. In contrast, the optical resonators used in the devices described here may have low optical losses such as WGM resonators where light circulate in the resonators in WGMs by total internal reflection at the exterior surfaces of the resonators. WGM resonators may be designed and manufactured to have very high quality factors on the order from $10^6$ to $10^9$.

Furthermore, EIT in an atomic vapor requires a pump beam from a powerful drive laser to create the condition for the EIT to occur by optically pumping the atomic transitions. In the resonator-based devices described here, no drive power is needed for any optical pumping. The narrow transmission peak is present by virtue of presence with the proper optical coupling of the resonators. Hence, the input optical signal to be delayed or filtered, when tuned to the desired frequency, automatically undergoes the delay and filtering by the tunable narrow transmission peak no matter what the power level of the input signal is. The optical resonators generally consume much less power than atomic vapors used in EIT systems.

The resonator-based devices described here have many other advantages over the EIT atomic systems. For example, the size of an EIT atomic system is often dictated by the size of the atomic cell for containing the atomic vapor, which is on a centimeter scale, whereas WGM cavities can be on a submillimeter scale. As another example, for certain atomic vapors, the atomic cell in an EIT atomic system is usually operated under an evaluated temperature such as in a heating oven and the temperature of the oven needs to be stabilized to maintain the vapor density in the cell. Such requirements increase complexity of the devices, increase the size the devices, and often severely limit the applications of the devices. The resonator-based devices described here, in contrast, do not have such requirements and can be operated at various temperatures (e.g., the ambient temperature) and be configured in compact packages or integrated on a substrate for a wide range of applications.

It is further noted that, many reported spectral linewidths of the EIT in atomic vapors are limited to narrow resonances with corresponding delays in the microsecond range. The tunable delays in the range of nanoseconds that are required in a number of practical applications cannot be easily obtained with EIT in atomic vapors. The resonator-based devices described here, however, can be configured to achieve the optical delays in the range of nanoseconds. Whispering-gallery-mode (WGM) resonator systems are described here as examples to mimic the narrow linewidths obtained with EIT. The simple tuning of the frequency and the width of the resonances and the controllable delay of optical signals are highly desirable functionalities for signal processing applications.

The tunable device 100 in FIG. 1A uses optical coupling of two optical resonators to achieve narrow spectral features and to tune at least one of the resonators to adjust the spectral features. The linewidth of the transmission peak of the tunable device 100 could be much narrower than the spectral width of each loaded resonator. The lower limit of the linewidths of such features is limited by optical losses caused by the intrinsic absorption and scattering in the resonator material and the resonator exterior surfaces. The design for the tunable device 100, however, is not limited to the configuration with two resonators. One or more additional optical resonators may be coupled to the two resonators 110 and 120 via the waveguides 101 and 102 to form tunable devices with a chain of three or more coupled resonators.

In the above examples, two adjacent optical resonators are not directly coupled to each other but are indirectly coupled via the waveguides 101 and 102. Alternatively, two adjacent optical resonators, such as 110 and 120, may be directly coupled to each other provide direct exchange of energy between the resonators 101 and 102 in addition to the optical coupling via the waveguides 101 and 102. As one example, the two resonators 110 and 120 may be sufficiently close to or in direct contact with each other to exchange optical energy via evanescent fields of the resonant modes of the two resonators. In addition, an optical coupling element may be used between the two resonators 110 and 120 to provide this direct optical coupling without relying on the waveguides 101 and 102. Examples of the optical coupling element include an optical grating, which may be inserted between the resonators or directly formed on the surface of at least one resonator, and a photonic band gap material inserted between the resonators. This direct optical coupling between two adjacent optical resonators in combination with the optical coupling via the waveguides provides unique spectral features in devices for high-order optical filtering.

Figure 3A:
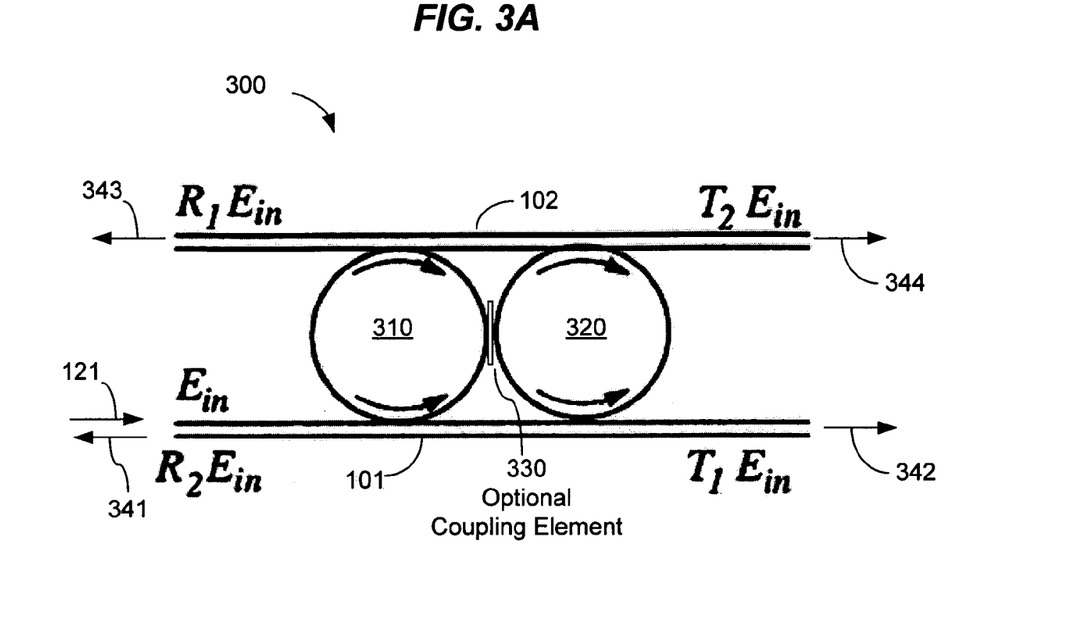
FIG. 3A shows another example of a resonator-based device where two resonators are directly coupled to each other in addition to coupling via two waveguides.

FIG. 3A shows a device 300 that use two separates optical waveguides 101 and 102 to couple two optical resonators 310 and 320 in a similar configuration as in the device 100 in FIG. 1A. However, different from the device 100, the two resonators 310 and 320 are directly coupled to each other to exchange optical energy with or without an optical coupling element 330 between the resonators 310 and 320. In one implementation, the resonators 310 and 320 are placed close enough to have a nonzero side coupling. Hence, the resonators 310 and 320 are coupled to each other via two different mechanisms: the indirect coupling via the waveguides 101 and 102 and direct coupling without the waveguides. The present of this new direct coupling adds additional path ways for the optical signals to overlap and mix.

Referring back to FIG. 1A, without the direct coupling between the two resonators 110 and 120, the optical signals in both resonators circulate in the clockwise direction when the input signal 121 is directed into the device 100 via the first waveguide 101 as illustrated. Two output signals are generated: the reflected signal 123 to the left side of the second waveguide 102 and the transmitted signal 122 to the right in the first waveguide 101. In comparison, the same input signal 121, in the presence of the direct coupling between two resonators 310 and 320 in the device 300, will lead to counter-propagating signals in each of the two resonators 310 and 320 and four output signals 341, 342, 343, and 344. The signal 341 is the first reflected signal from the device 300 in the first waveguide 101, the signal 342 is the first transmitted signal in the first waveguide 101, the signal 343 is the second reflected signal in the waveguide 102 and the signal 344 is the second transmitted signal in the waveguide 102.

One notable effect of the added direct coupling in device 300 is that a third-order filter function can be generated with the two resonators 310 and 320. This is in contrast to previous belief that a second-order filter function is generated by cascading two WGM resonators.

Figure 3B:
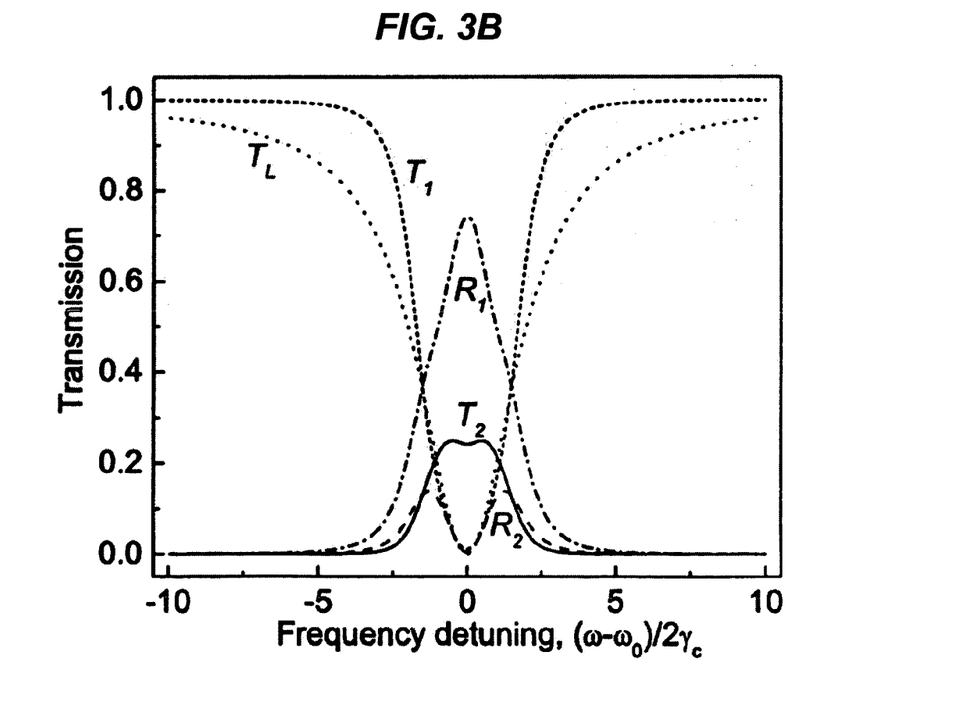
FIG. 3B shows the signal spectra in the device in FIG. 3A when the resonators are WGM resonators.
Figure 3C:
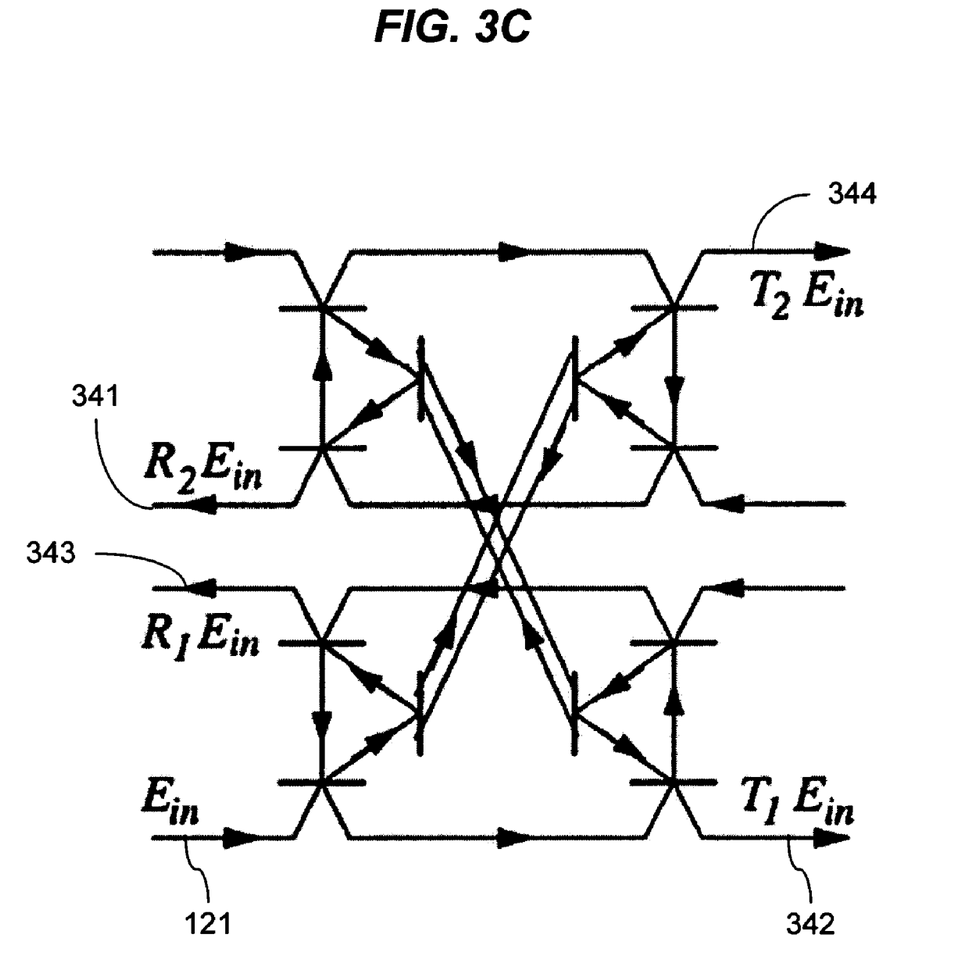
FIG. 3C shows an optical device with four ring resonators that is equivalent to the device shown in FIG. 3A in certain aspects.

FIG. 3B shows the spectra of the two transmitted signals 342 and 344 in FIG. 3A. The amplitudes of the transmission and reflection decrease as the third power of the detuning from the central filter frequency $\omega_o$. This unusually increased order filter function arises from the presence of two degenerate modes in each optical resonator (e.g., ring resonator or WGM resonator). With indirect coupling via the waveguides 101 and 102 and the direct coupling between the resonators 310 and 320, the device 300 becomes equivalent to a system of four coupled ring resonators when all those four modes are coupled as shown in FIG. 3C. The narrow spectral feature is absent from the spectra in FIG. 3B because of the choice of coupling phase $\psi=\pi/2$ used in the computations shown in FIG. 3B for the device 300 and will be present when the coupling phase is $\pi$. Therefore, the device 300 can be used as a high-order optical filter that has a much flatter passband and a sharper roll-off than a Lorentzian transfer function filter based on a single resonator, and than a second-order filters that use two cascaded resonators without the complex coupling shown in FIG. 3A.

In the device 300, the resonators 310 and 320 may be configured to have fixed resonance frequencies. Alternatively, the device 300 may have one or more resonators that are tunable to tune the spectral response of the device 300. Similar to the device 100 in FIG. 1A, one or more resonators may be added between the waveguides 101 and 102 in device 300.

Figure 4A:
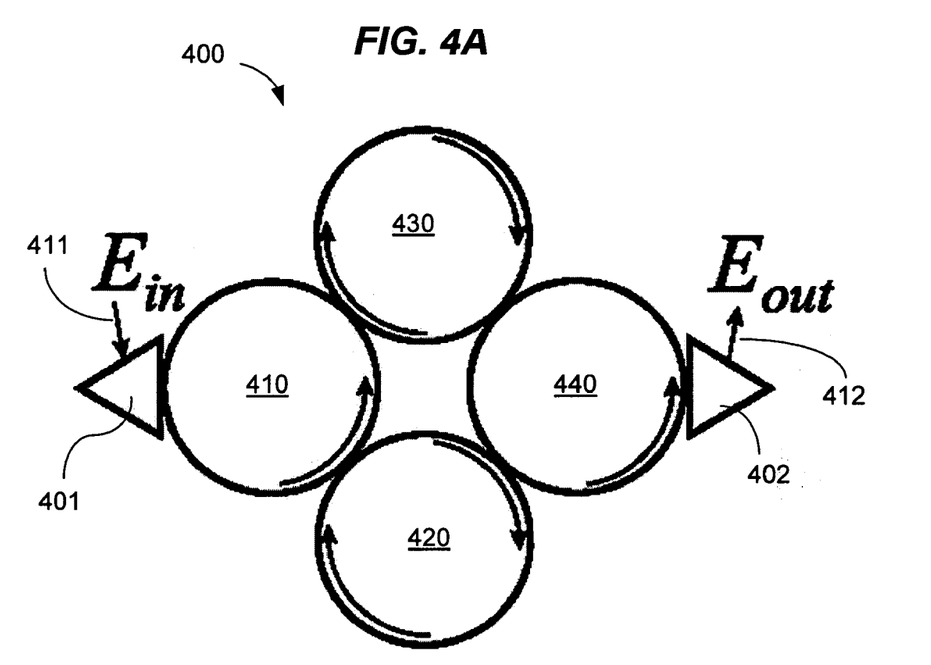
FIGS. 4A and 4B show resonator-based devices with four coupled resonators in two different configurations.

FIG. 4A shows another resonator-based device 400 having four directly coupled optical resonators 410, 420, 430, and 440. The resonators may be implemented as, for example, ring resonator or WGM resonators. The direct coupling between two resonators may be effectuated by close proximity or direct contact via evanescent fields, or by using an optical coupling element between two coupled resonators. An input optical coupler 401 is used to couple an input signal 411 into the resonator 410 and an output optical coupler 402 is used to couple light out of the resonator 440 as an output signal 412. Micro prisms, tapered fibers, photonic band gap materials, and others may be used as the optical couplers 401 and 402. The direct coupling between two resonators is the sole coupling mechanism to keep the light circulating within the four resonators. As illustrated, the optical signals in the resonators 410 and 420 are in the counter clockwise direction while the optical signals in the resonators 420 and 430 are in the clockwise direction. There is no reflected signal in the device 400. The resonators in FIG. 4A may be configured to have fixed resonance frequencies. Alternatively, the device 400 may have one or more resonators that are tunable to tune the spectral response of the device 400.

Figure 4B:
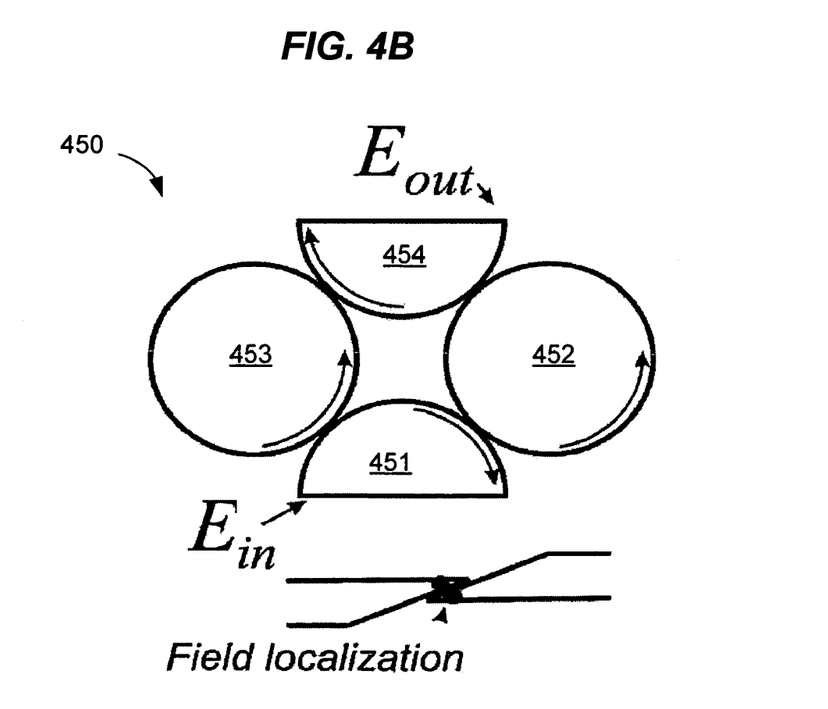

FIG. 4B shows another 4-resonator device 450 where resonators 451, 452, 453, and 454 are optically coupled to one another similar to the device 400 in FIG. 4A. Hence, like the device in FIG. 4A, the direct coupling between two resonators in device 450 may be effectuated by close proximity or direct contact via evanescent fields, or by using an optical-coupling element between two coupled resonators. The input resonator 451 and the output resonator 452 may be half spheres or half disks to allow input and output optical coupling while resonators 452 and 453 are spheres or disks.

A tunable resonator suitable for devices in FIGS. 1A, 3A, 4A and 4B and their variations may be implemented in various configurations. When a tunable WGM resonator is used, for example, the tuning may be achieved by thermal control of the resonator whose index, dimension, or both change with temperature, mechanical control of the resonator by changing the dimension of the resonator, electrical control, or optical control. Electro-optic materials may be used to control and tune the resonance frequency of the WGM resonator by an external control signal.

Figure 5A:
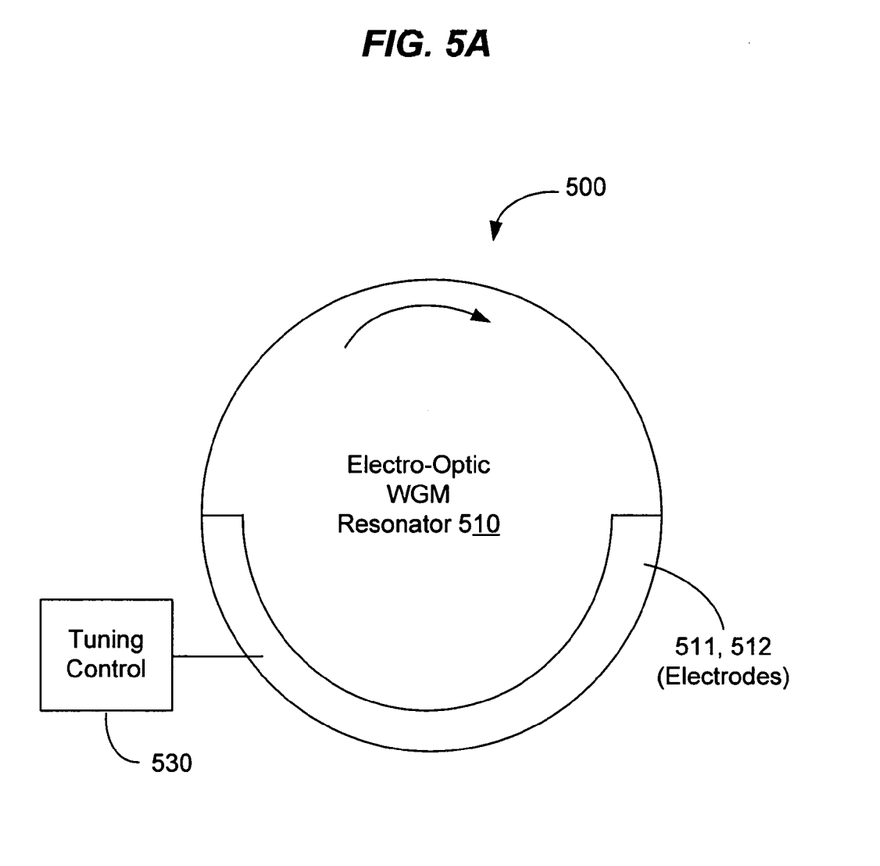
FIGS. 5A and 5B show an example of a tunable electro-optic WGM disk resonator.
Figure 5B:
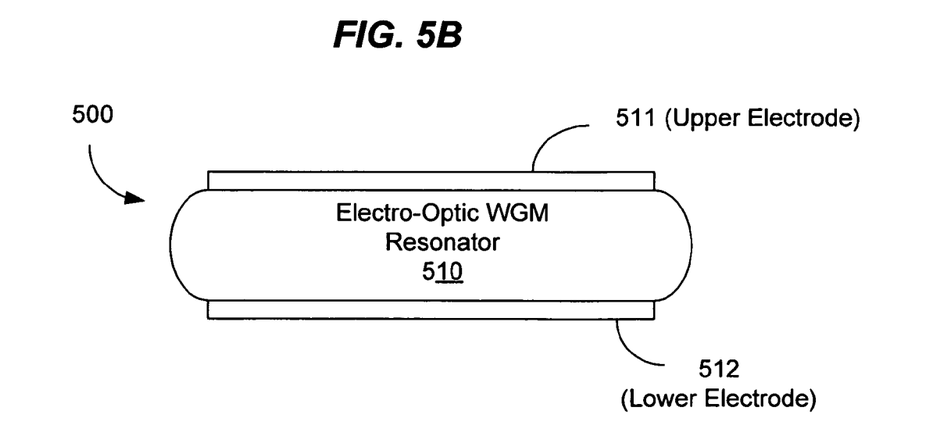

FIGS. 5A and 5B show an example of a tunable electro-optic WGM resonator 500 having a WGM resonator 510. The electro-optic material for the entire or part of the resonator 510 may be any suitable material, including an electro-optic crystal such as Lithium Niobate and semiconductor multiple quantum well structures. One or more electrodes 511 and 512 may be formed on the resonator 510 to apply a control electrical field in at least the region where the WG modes are present to control the index of the electro-optical material and to change the filter function of the resonator. Assuming the resonator 510 has disk or ring geometry, the electrode 511 may be formed on the top of the resonator 510 and the electrode 512 may be formed on the bottom of the resonator 510 as illustrated in the side view of the device in FIG. 5B. In implementation, the electrodes 511 and 512 may be in various geometries to apply a control voltage to tune the resonator. For example, the electrodes 511 and 512 may be microstrip line electrodes. A tuning control unit 530 such as a control circuit may be used to supply the electrical control signal to the electrodes 511 and 512. In operating the tunable resonator 500, the control unit 530 may supply a voltage as the electrical control signal to the electrodes 511 and 512. The control voltage may be a DC voltage to set the resonance peak of the resonator 500 at a desired spectral location. The DC voltage may be adjusted by the control unit 530 to tune the spectral position of the transmission peak when such tuning is needed. For dynamic tuning operations, the control unit 530 adjusts the control voltage in response to a control signal to, e.g., maintain the transmission peak at a desired spectral position or frequency or to change the frequency of the transmission peak to a target position. In some other operations, the control unit 530 may adjust the control voltage in a time varying manner, e.g., scanning the transmission peak at a fixed or varying speed or constantly changing the transmission peak in a predetermined manner.

For example, a Z-cut $LiNbO_3$ disk cavity with a diameter of d=4.8 mm and a thickness of 170 μm may be used as the resonator 510. The cavity perimeter edge may be prepared in the toroidal shape with a 100 μm radius of curvature. As an alternative to the strip electrodes shown in FIG. 5A, the top and bottom surfaces of the disk resonator may be coated with conductive layers for receiving the external electrical control signal. A metal such as indium may be used to form the conductive coatings. Tuning is achieved by applying and adjusting a voltage to the top and bottom conductive coatings. Each conductive coating may be absent on the central part of the resonator and are present at the perimeter edge of the resonator where WGMs are localized.

In summary, only a few implementations are disclosed. However, it is understood that variations and enhancements may be made.

What is claimed is what is described and illustrated, including:

1. A method, comprising:
   optically coupling a first optical resonator with a first resonance frequency to first and second optical waveguides, wherein the first optical resonator is tunable to change the first resonance frequency;
   optically coupling a second optical resonator with a second resonance frequency to the first and second optical waveguides to cause an optical interference between optical signals that transmit through the first and second optical resonators via the first and second waveguides to produce a narrow spectral transmission peak centered at an average frequency of the first and the second resonance frequencies; and
   tuning the first optical resonator to change a difference between the first and second resonance frequencies to change an optical delay of light in the transmission peak.

2. The method as in claim 1, further comprising tuning the first optical resonator to change a sum of the first and second resonance frequencies and to tune the transmission peak in frequency.

3. The method as in claim 1, further comprising using a first whispering gallery mode resonator as the first optical resonator and a second whispering gallery mode resonator as the second optical resonator.

4. The method as in claim 1, wherein the second optical resonator is tunable to change the second resonance frequency, and the method further comprising tuning the second optical resonator, in addition to tuning the first optical resonator, to change the difference between the first and second resonance frequencies.

5. The method as in claim 4, further comprising tuning at least one of the first and second optical resonators to change a sum of the first and second resonance frequencies and to tune the transmission peak in frequency.

6. The method as in claim 4, wherein each of the first and second optical resonators is a tunable electro-optic optical resonator.

7. The method as in claim 1, wherein the first optical resonator is a tunable electro-optic optical resonator.

8. The method as in claim 1, further comprising placing the first and second optical resonators relative to each other so that the first and second optical resonators are not directly optically coupled to each other and are optically coupled via optical coupling to the first and second waveguides.

9. The method as in claim 1, further comprising placing the first and second optical resonators relative to each other so that the first and second optical resonators are directly optically coupled to each other in addition to optical coupling with each other via optical coupling to the first and second waveguides.

10. The method as in claim 9, further comprising controlling the direct coupling between the first and second optical resonators to make the transmission peak a third-order filter function.

11. The method as in claim 1, further comprising optically coupling at least a third optical resonator with a third resonance frequency to the first and second optical waveguides to cause an optical interference with optical signals that transmit through the first, second, and third optical resonators via the first and second waveguides.

12. The method as in claim 1, further comprising tuning the first optical resonator to change a linewidth of the transmission peak from hundreds of kilohertz to several GigaHertz.

13. The method as in claim 1, further comprising controlling optical coupling of the first and second optical resonators, and the first and second waveguides to make a linewidth of the transmission peak to be less than a linewidth of each of the first and second optical resonators.

14. A device, comprising:
a first optical resonator with a first resonance frequency that is tunable to change the first resonance frequency;
a first optical waveguide optically coupled to the first optical resonator;
a second optical waveguide optically coupled to the first optical resonator;
a second optical resonator with a second resonance frequency and optically coupled to the first and second optical waveguides, respectively, to cause an optical interference between optical signals that transmit through the first and second optical resonators via the first and second waveguides to produce a narrow spectral transmission peak centered at an average frequency of the first and the second resonance frequencies; and
a tuning mechanism to tune the first optical resonator to change a difference between the first and second resonance frequencies to change an optical delay of light in the transmission peak.

15. The device as in claim 14, wherein the first and second optical resonators are whispering gallery mode resonators.

16. The device as in claim 14, wherein the second optical resonator is tunable to change the second resonance frequency.

17. The device as in claim 16, wherein the tuning mechanism operates to tune at least one of the first and second optical resonators to change a sum of the first and second resonance frequencies and to tune the transmission peak in frequency.

18. The device as in claim 16, wherein each of the first and second optical resonators is a tunable electro-optic optical resonator.

19. The device as in claim 14, wherein the first optical resonator is a tunable electro-optic optical resonator.

20. The device as in claim 14, wherein the first and second optical resonators are not directly optically coupled to each other and are optically coupled via optical coupling to the first and second waveguides.

21. The device as in claim 14, wherein the first and second optical resonators are directly optically coupled to each other in addition to optical coupling with each other via optical coupling to the first and second waveguides.

22. The device as in claim 21, wherein the first and second optical resonators are directly coupled to make the transmission peak a third-order filter function.

23. The device as in claim 14, further comprising at least a third optical resonator with a third resonance frequency optically coupled to the first and second optical waveguides to cause an optical interference with optical signals that transmit through the first, second, and third optical resonators via the first and second waveguides.

24. The device as in claim 14, wherein the tuning mechanism operates to tune the first optical resonator to change a sum of the first and second resonance frequencies and to tune the transmission peak in frequency.

25. The device as in claim 14, wherein the first optical resonator is mechanically tunable.

26. The device as in claim 14, wherein the first optical resonator is optically tunable.

27. The device as in claim 14, wherein the first optical resonator is thermally tunable.

28. The device as in claim 14, wherein the first optical resonator is electrically tunable.

29. A device, comprising:
a first resonator in resonance with electromagnetic radiation at a first resonance frequency that is tunable to change the first resonance frequency;
a first waveguide coupled to the first optical resonator to exchange electromagnetic radiation;
a second waveguide coupled to the first resonator to exchange electromagnetic radiation;
a second resonator in resonance with electromagnetic radiation with a second resonance frequency and coupled to the first and second waveguides, respectively, to cause an electromagnetic interference between electromagnetic signals that transmit through the first and second resonators via the first and second waveguides to produce a narrow spectral transmission peak centered at an average frequency of the first and the second resonance frequencies; and
a tuning mechanism to tune the first resonator to change a difference between the first and second resonance frequencies to change a delay of electromagnetic radiation in the transmission peak.

30. The device as in claim 29, wherein the first and second resonators and waveguides are devices for microwave signals.

31. The device as in claim 29, wherein the first and second resonators and waveguides are devices for millimeter wave signals.

32. The device as in claim 29, wherein the first and second resonators and waveguides are devices for optical signals.

33. The device as in claim 29, wherein the first and second resonators are directly coupled to each other to exchange energy.

34. The device as in claim 29, further comprising a coupling element coupled between the first and second resonators to assist coupling of energy therebetween without going through the first and second waveguides.

35. A device, comprising:
a first optical resonator with a first resonance frequency;
a first optical waveguide optically coupled to the first optical resonator;
a second optical waveguide optically coupled to the first optical resonator;
a second optical resonator with a second resonance frequency and optically coupled to the first and second optical waveguides, respectively, to cause an optical interference between optical signals that transmit through the first and second optical resonators via the first and second waveguides to produce a narrow spectral transmission peak centered at an average frequency of the first and the second resonance frequencies, wherein the first and second optical resonators are directly optically coupled to each other in addition to optical coupling with each other via optical coupling to the first and second waveguides.

36. The device as in claim 35, wherein at least the first optical resonator is tunable to change the first resonance frequency.

37. A device, comprising first, second, third, and fourth optical resonators optically coupled to one another in a configuration that, the first optical resonator is optically coupled to the second and third optical resonators, the second optical resonator is further optically coupled to the fourth optical resonator, the third optical resonator is further optically coupled to the fourth optical resonator, and the second and third optical resonators are not directly coupled to each other and are indirectly coupled via the first and fourth optical resonators.

38. The device as in claim 37, wherein at least one of the first, second, third, and fourth optical resonators is tunable to change a resonance frequency.

39. The device as in claim 37, further comprising:

a first optical coupler optically coupled to the first optical resonator to direct an input optical signal to the first optical resonator; and a second optical coupler optically coupled to the fourth optical resonator to couple light in the fourth optical resonator out as an optical output signal.

40. The device as in claim 37, wherein the first and fourth optical resonators are half disk resonators and the second and third resonators are full disk resonators.

* * * * *